United States Patent Office 3,000,194
Patented Sept. 19, 1961

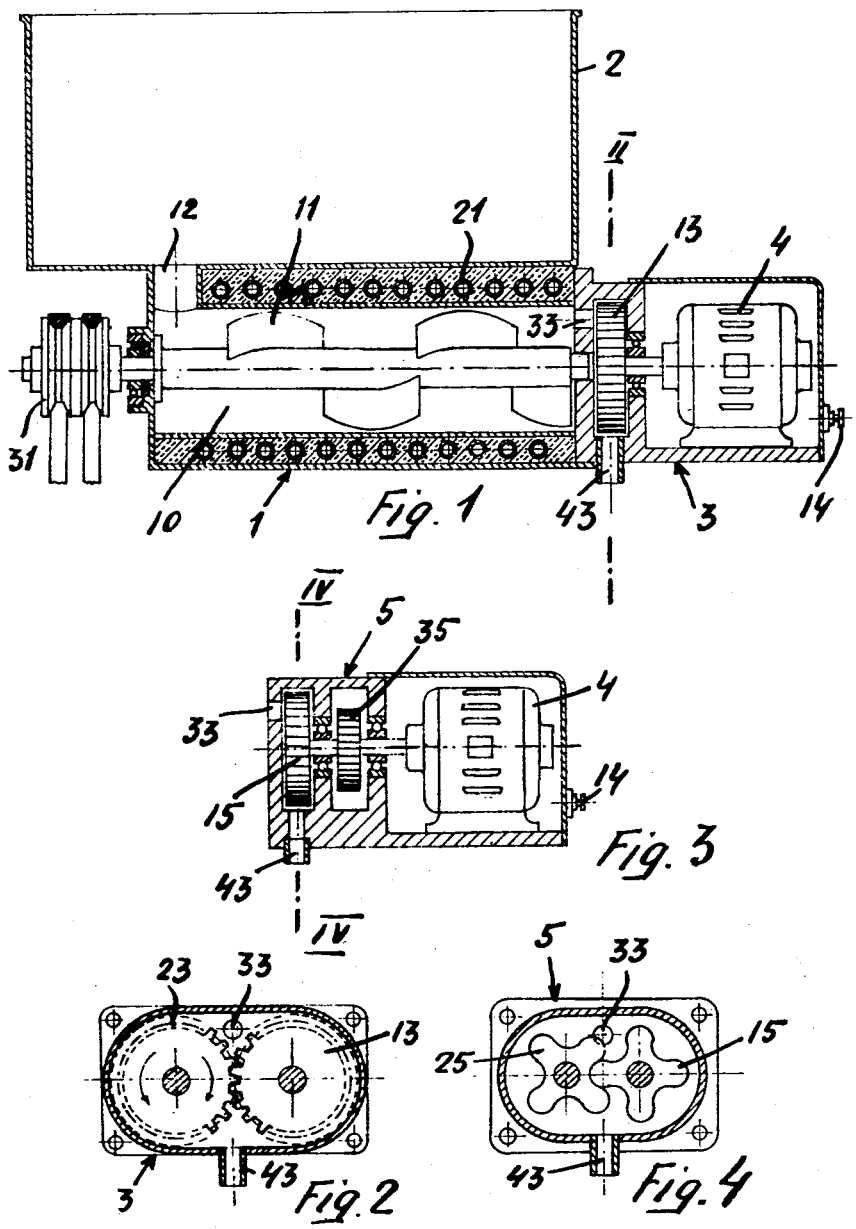

3,000,194
CONTINUOUS ICE-CREAM MACHINE
Poerio Carpigiani, 14 Via Cairoli, Bologna, Italy
Filed June 23, 1960, Ser. No. 38,182
Claims priority, application Italy July 4, 1959
3 Claims. (Cl. 62—342)

This invention relates to a machine for the continuous manufacture of ice-cream, the so-called "espresso" ice-cream machine, in which the mixture to be frozen enters as a liquid the machine where it is subjected to a freezing, mixing and air additioning operation after which it is delivered from another part of the machine as ice-cream.

Machines of this kind can roughly be divided into two classes:

(a) Those in which the liquid mix is fed under pressure and already mixed with air into the mixing chamber.

(b) Machines in which a certain quantity of liquid mix is fed into the mixing chamber so as always to leave an air space, the air being mixed with the liquid by mechanical agitation.

The machines of the first type have the drawback of working under pressure whch means that pressure-tight parts, difficult to manufacture, are needed. They also require special vent valves for possible excess of pressure.

The machines of the second type, although they get rid of the disadvantages of the first, present the problem of introducing the exact amount of liquid mix into the mixing chamber; too much or too little would alter the quality of the finished ice-cream.

In addition, both these machines have the same disadvantage in that it is impossible to mix in with the liquid mixture solid particles such as bits of fresh or candied fruit, nougat, almonds and so on, owing to the difficulty or impossibility of passing solids through the various ducts, valves and pumps.

It is therefore a primary object of the present invention to provide a continuous ice-cream machine, in which air is fed into the mixing chamber from the ice-cream delivery end against the flow of the freezing liquid mix.

A further object is to provide a machine in which the mixing chamber is in direct communication with the tank containing the liquid to be frozen so that the mixture fills completely the said chamber and both liquid and air may freely flow back from the mixing chamber into the said tank or container.

In this way the following advantages are achieved:

(1) After having gone through the mixing chamber, the excess air forced into the container blows away or prevents the formation of any ice-cream plugs in the opening between the mixing chamber and the container.

(2) This same air, bubbling up through the liquid in the container, ensures both a primary saturation of the liquid and its agitation, particularly useful if the mixture contains solid fragments.

(3) The opening between the container and the mixing chamber can be large enough to permit the passage of little solid pieces of candied fruit, nuts etc. to be incorporated in the ice-cream to produce "cassata."

For such purposes the connection between container and mixing chamber can be a hole or a very short duct at the back of the mixing chamber, while at the other end of this chamber—the ice-cream delivery end—there is the air feed pump. By using a gear pump driven by a motor capable of rotating in both directions or connected to the pump by means of a reverse gear drive, a further advantage is achieved by the possibility of using the pump for suction and delivery of the ice-cream.

By regulating the working of the pump in the direction of the delivery of the ice-cream, one thereby obtains a device which acts as controller of the amount delivered. As the delivery duct and the air suction duct are constituted by the same duct there is also avoided the dripping of part of the ice-cream which adheres to the delivery nozzle and tends to liquefy. Thus when the delivery of the ice-cream is finished, by inverting the movement of the pump, the residual part of the ice-cream on the delivery nozzle is sucked back into the mixing-chamber.

Other advantages of this continuous ice-cream mixer will be seen from the following specification of some embodiments shown by way of non-limiting examples on the attached drawings, in which:

FIGURE 1 is a cross-section of a continuous ice-cream mixer fitted with a device according to the invention.

FIGURE 2 is a transverse section of the gear pump mounted on the delivery end of the mixing chamber of the machine of FIG. 1.

FIGURES 3 and 4 are, respectively an axial section and a transverse section of a further embodiment of gear pump to be mounted in front of the mixing chamber.

With particular reference to FIG. 1, 1 indicates a freezer-mixer with a horizontal cylinder provided with a spiral mixer 11 and with a jacket containing a freezing coil 21 as normally used in "espresso" ice-cream machines. Into the mixing-chamber 10 of this freezer-mixer the liquid mixture comes from the above situated container 2 through a hole in the bottom and through a short duct 12 which leads into the rear end of the mixing chamber 10. On the front end of the chamber 10 of the freezer and mixer 1, there is a suitable reversible pump for example a gear pump 3 which in the case illustrated is of the two-gears type 13 and 23 provided with a duct 33 connecting to the mixing chamber and a duct 43 connecting to the outside.

The pump 3 is driven preferably by a reversible motor 4 whose inversion may be controlled, for example, by a push-button 14. For the remainder, the motor 4 is controlled by a common switch together with the motor (not shown) that drives the pulley 31 on the mixing shaft 11, so that when the mixer 11 is rotating (in one direction only) the pump 3 works too in one of its directions. The pump may also work by being keyed to the mixer 11. In this case if it is desired to use it as dispenser a mechanical direction changer will have to be inserted between the pump and mixer.

The operation of the ice-cream machine is as follows:

The liquid mix is poured into the container 2 and flows into the mixing chamber through the duct 12 completely flooding the said chamber. Then both the mixer-motor and the pump 3 are set in motion, the latter in anticlockwise direction as shown by the left-hand arrow in FIG. 2. The air that is thus sucked up through the short tube 43, which, as will be seen hereinafter, may serve as the ice-cream delivery nozzle, is sent to the mixing chamber through the duct 33, where it becomes incorporated with the liquid or semi-frozen mix. Part of it in the form of excess air goes through the duct 12 and bubbles up through the liquid in the container and escapes. This action ensures a pre-saturation of the liquid at normal pressure.

Once the ice-cream is made, in order to deliver it, it is sufficient to set the mixer and pump in motion, this time in clockwise direction as shown by the right-hand arrow. This could be done very simply by the operator by having, for example, a pushbutton 14 near at hand. The ice-cream is sent towards the pump by the mixer, the pump sucks it through the duct 33 and forces it through the short tube 43 which now acts as delivery nozzle. The quantity of ice-cream delivered will depend upon the length of time during which the button 14 is kept pressed.

Thus not only is it possible to deliver any desired quantity without repeated actions of the delivery gear, but by having a timing action fitted it is possible to deliver portions that are exactly equal.

After delivery, the motor is automatically reversed by releasing the button 14, and the ice-cream present in the outlet nozzle is sucked back into the mixing chamber by the pump. Thus the inconvenience, common to this type of machines, of having ice-cream dripping from the delivery nozzle is avoided. When the machine is not working the gear pump serves as a labyrinth joint to prevent the ice-cream escaping.

It must be pointed out that in the machine shown, the motor 4 is automatically set in motion whenever the mixer 11 is started and vice-versa. This, however, might not be necessary in the case of a geared pump being used for the delivery of the ice-cream if, for example, the ice-cream machine is of the atmospheric or super-atmospheric type.

This invention also solves the problem of the continuous manufacture of "cassata" type ice-cream i.e. ice-cream containing little pieces of solid fruit or nuts. These solid substances are introduced with the liquid mix into the container and are kept in suspension by the air bubbling through. They easily pass through the short tube 12 to the mixing chamber, and the finished "cassata" may be delivered by using a geared pump with few teeth or lobes. One such pump is shown in FIGS. 3 and 4 and consists of a pair of sucking-squeezing gears 15 and 25 formed, for example, by four lobes each, in which the lobes are interlocked so as to leave wide spaces. These gears are driven by a co-axial control gear pair, keyed and housed separately from the pump gears proper.

Although the motor 4 is shown directly connected to the pump, it may, of course, have a suitable step-down gear inserted between it and the pump. And the reverse movement of the pump, while it is described as being obtained by reversing the direction of the motor, can obviously be obtained by means of a fitted mechanical arrangement. The device illustrated and described can, in addition, be fitted to already existing ice-cream machines by means of certain modifications and by mounting the gear-pump in the place of the usual ice-cream dispensing taps or in addition to these same taps if one wished to use the pump only for mixing air into the ice-cream.

I claim:

1. In a machine for the continuous manufacture of ice-cream, comprising a horizontal cylindrical freezing and mixing chamber, a rotatable helical mixer in said chamber, a tank for the liquid mixture to be frozen mounted above said mixing chamber, a duct connecting said tank with the top of said chamber at one end thereof, and dispensing means at the opposite end of said chamber and including passage means connecting said chamber with atmosphere and a pump cooperative with said passage means for selectively dispensing ice cream from said chamber and forcing air into said chamber to disperse through any mixture in said chamber and rise through said duct and tank to preaerate the liquid mixture in said tank.

2. A machine according to claim 1 in which said passage means includes a short tube between said pump and said chamber and a nozzle from said pump to atmosphere, and said pump is a reversible gear pump, whereby by driving said pump in one direction air is sucked through said nozzle from atmosphere and forced through said tube into said mixing chamber and the excess, if any, after having traversed the whole mixing chamber, escapes through said duct and the liquid mixture in said tank, and by driving said pump in opposite direction, the contents of the mixing chamber is sucked by said pump from said chamber through said tube and delivered through said nozzle.

3. A machine according to claim 1 in which the lower part of said tank for the liquid mixture to be frozen is directly in contact with the jacket surrounding the said mixing chamber and containing the freezing coil.

References Cited in the file of this patent
UNITED STATES PATENTS

| | | |
|---|---|---|
| Re. 20,987 | Routh | Jan. 24, 1939 |
| 1,902,346 | Vogt | Mar. 21, 1933 |
| 2,045,835 | Routh | Sept. 22, 1936 |
| 2,211,387 | Routh | Aug. 13, 1940 |
| 2,737,024 | Swenson | Mar. 6, 1956 |
| 2,924,952 | Swenson | Feb. 16, 1960 |
| 2,947,155 | Phelan | Aug. 2, 1960 |